June 23, 1959   A. W. AHLGREN   2,891,810
CLOSURE FASTENER
Filed Dec. 28, 1955
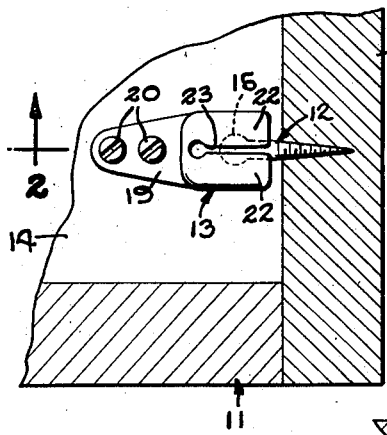
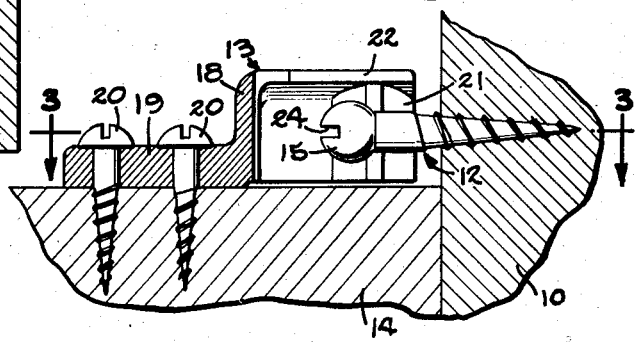
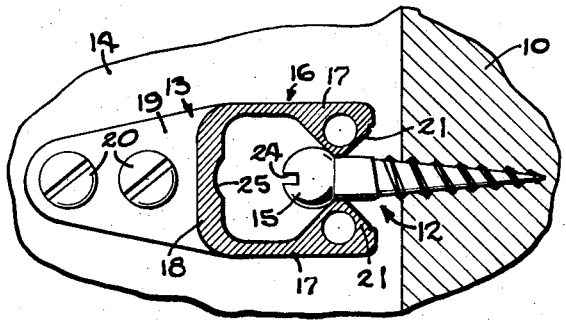
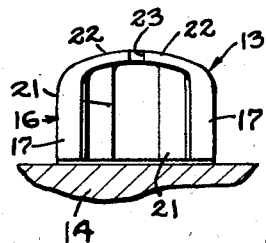
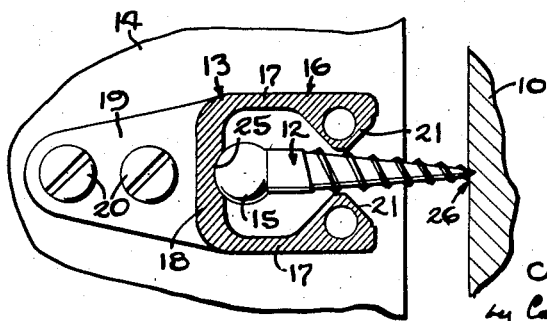
INVENTOR
Axel W. Ahlgren
by Carlson, Pitzner, Hubbard & Wolfe
ATTORNEY United States Patent Office 2,891,810
Patented June 23, 1959

2,891,810

CLOSURE FASTENER

Axel W. Ahlgren, Rockford, Ill., assignor to Amerock Corporation, a corporation of Illinois Application December 28, 1955, Serial No. 555,871

1 Claim. (Cl. 292—76)

This invention relates to a fastener for holding a door against a frame and, more particularly, to a closure fastener in which a strike mounted on the door and having an enlarged end portion enters between two yieldable fingers of a catch on the frame. In some of its aspects, the invention relates to such a fastener in which the catch, including the fingers, is made as a single piece of molded nylon.

One object of the invention is to provide a new and improved closure fastener of the above character which is attractive in appearance and still produces an effective spring action for latching the door in place.

Another object is to provide such a fastener with a novel means for locating the strike so that the strike enters properly between the legs of the catch.

Other objects and advantages of the invention will become apparent from the following detailed description taken in connection with the accompanying drawings, in which Figure 1 is a fragmentary sectional view showing a closure fastener embodying the novel features of the present invention.

Fig. 2 is an enlarged fragmentary sectional view taken along the line 2—2 in Fig. 1.

Fig. 3 is a fragmentary sectional view taken along the line 3—3 in Fig. 2.

Fig. 4 is a view similar to Fig. 3 but illustrating the manner of mounting the strike.

Fig. 5 is an end view of the catch.

As shown in the drawings for purposes of illustration, the invention is shown embodied in a fastener for holding a door 10 closed across an opening in a frame 11. In general, the fastener comprises a strike 12, which herein is mounted on the door, and a catch 13 conveniently secured to a portion of the frame such as the shelf 14. The catch yieldably engages an enlarged end portion 15 of the strike to hold the door closed while permitting the door to be opened.

In the present instance, the catch is a unitary piece of molded nylon and includes a U-shaped body portion 16 (see Fig. 3) formed by elongated parallel legs 17 spaced apart and connected at adjacent ends by a crosspiece 18. The body portion is disposed with the legs and crosspiece in vertical planes, and is mounted on the shelf 14 with the legs projecting toward the opening in the frame 11. An elongated flat flange 19 projects rearwardly from the lower edge of the crosspiece and is formed with holes for receiving screws 20 which are used to attach the catch 13 to the shelf.

Advantage is taken of the yieldable characteristics of molded nylon to utilize the legs 17 as the spring fingers of the catch. To this end, opposed lugs 21 are formed on the free end portions of the legs along the inner sides thereof. The lugs are spaced apart a distance less than the width of the enlarged end portion 15 of the strike 12 so that, when the door 10 is closed, this enlarged portion enters between the lugs spreading the fingers 17 apart until it passes beyond the lugs. At that time, the fingers spring back toward their original positions locating the lugs behind the enlarged strike end whereby the lugs yieldably hold the door closed.

To improve the appearance of the catch 13, the latter is provided with a smooth and generally uninterrupted outer surface and this without interfering with the spring action of the legs 17. For this purpose, the space within the U of the body portion 16 is enclosed by covering the upper end of the body. Thus, flat flanges 22 (Figs. 1 and 5) integral with the legs and the crosspiece 18 project inwardly from and at right angles to the legs. The flanges 22 stop short of each other to define a slot 23 between them and, in this way, the legs are left free for independent flexing as the enlarged end 15 of the strike 12 passes between the lugs 21. In effect, therefore, the catch 13 is formed with a body which is a single molded piece and is substantially closed, the legs 17 constituting side walls of the body, the crosspiece 18 an end wall and the flanges 22 a top wall.

Herein, the strike 12 is in the form of a screw threaded into the inside of the door 10 so as to project in between the legs 17 when the door is closed. The enlarged end 15 of the strike is spherical in shape and a slot 24 is formed in the outer end of the sphere to receive a screwdriver.

Means is provided for locating the strike 12 on the door 10 for proper entry into the catch 13. This means operates to hold the strike in the catch in a temporary position in which it is alined with but spaced inwardly from its normal position. With the strike thus held, the door may be closed against the pointed end of the strike and this makes a mark on the door where the strike should be mounted.

As shown in the drawings, the means for temporarily holding the strike in the catch includes a notch 25 formed in the inner surface of the crosspiece 18. The notch is disposed centrally of the crosspiece so as to be alined with the space between the lugs 21 and extends from the top to the bottom of the crosspiece. Preferably, the notch is arcuate in cross section (see Figs. 3 and 4) with the radius of the arc equal to the radius of the spherical end 15 of the strike.

With the foregoing arrangement, the catch 13 first is screwed to the shelf 14 with the legs 17 extending toward the frame opening. Then the strike 12 is temporarily placed in the catch in the position shown in Fig. 4, that is, with the spherical head 15 seated in the notch 25 and the threaded portion of the strike projecting between the lugs 21. The parts are dimensioned so that the lugs frictionally engage this threaded portion and hold the strike in place. Next, the door is closed against the strike whose pointed end makes an indentation 26 (Fig. 4). The latter marks the point where the strike should be threaded into the door.

I claim as my invention:

A catch for a closure fastener adapted to be used with a strike having an enlarged end portion, said catch being made of a single molded nylon piece and comprising spaced parallel side walls, an end wall connecting adjacent ends of said side walls, a top overlying said end and side walls and having a longitudinal slot which parallels the side walls and extends substantially the full length of the top wall whereby the side walls are free to flex relative to each other and constitute spring fingers, opposed lugs projecting inwardly from the free ends of said side walls and spaced apart a distance less than the width of the enlarged end portion of said strike, said side walls spreading apart as said end portion enters between said lugs and then springing back to position the lugs behind the end portion, and a flange integral with said walls to constitute an attaching means.

References Cited in the file of this patent

UNITED STATES PATENTS

| | | |
|---|---|---|
| 622,620 | Greenawalt | Apr. 4, 1899 |
| 1,191,711 | Linstrom | July 18, 1916 |
| 1,336,897 | Drummond | Apr. 13, 1920 |
| 2,511,998 | Rummelsburg | June 20, 1950 |

OTHER REFERENCES

American Builder Magazine, August 1954, page 58.